United States Patent [19]

Costanzo et al.

[11] 4,157,195
[45] Jun. 5, 1979

[54] JUNCTION COUPLING FOR PROVIDING A FLUID FLOW BRANCH FROM A MAIN CONDUIT

[75] Inventors: Francis X. Costanzo, Pittstown; Lawrence W. Thau, Jr., Newark, both of N.J.

[73] Assignee: Victaulic Company of America, South Plainfield, N.J.

[21] Appl. No.: 878,106

[22] Filed: Feb. 15, 1978

[51] Int. Cl.² .................................................. F16L 35/00
[52] U.S. Cl. .................................... 285/4; 85/61; 239/600; 285/111; 285/198
[58] Field of Search ............ 285/198, 197, 199, 180, 285/111, 4, 3; 85/61; 239/600, 542

[56] References Cited

U.S. PATENT DOCUMENTS

| 204,730 | 6/1878 | Hawkes | 285/197 X |
| 1,039,576 | 9/1912 | Mueller | 85/61 X |
| 2,892,226 | 6/1959 | Bradney | 85/61 X |
| 3,547,144 | 12/1970 | Mullins | 285/199 X |
| 3,999,785 | 12/1976 | Blakeley | 285/197 X |

FOREIGN PATENT DOCUMENTS

| 625461 | 8/1961 | Canada | 285/197 |
| 11455 of | 1894 | United Kingdom | 285/197 |

Primary Examiner—Dave W. Arola
Attorney, Agent, or Firm—Ladas, Parry, Von Gehr, Goldsmith & Deschamps

[57] ABSTRACT

The invention provides a junction coupling for branching a flow of fluid from a pipe or conduit. The junction coupling is essentially C-shaped and is dimensioned partly to surround such pipe or conduit. Opposite limbs of the C-shaped member carry, on the one hand, an outlet duct and on the other hand means for securing the coupling in position on the pipe or conduit. The outlet duct is alignable with an aperture in the conduit wall and adapted to receive a branch conduit. The dimensions of the C-shaped member are such that the coupling may be engaged over the pipe or conduit only at the location of the aperture therein.

8 Claims, 5 Drawing Figures

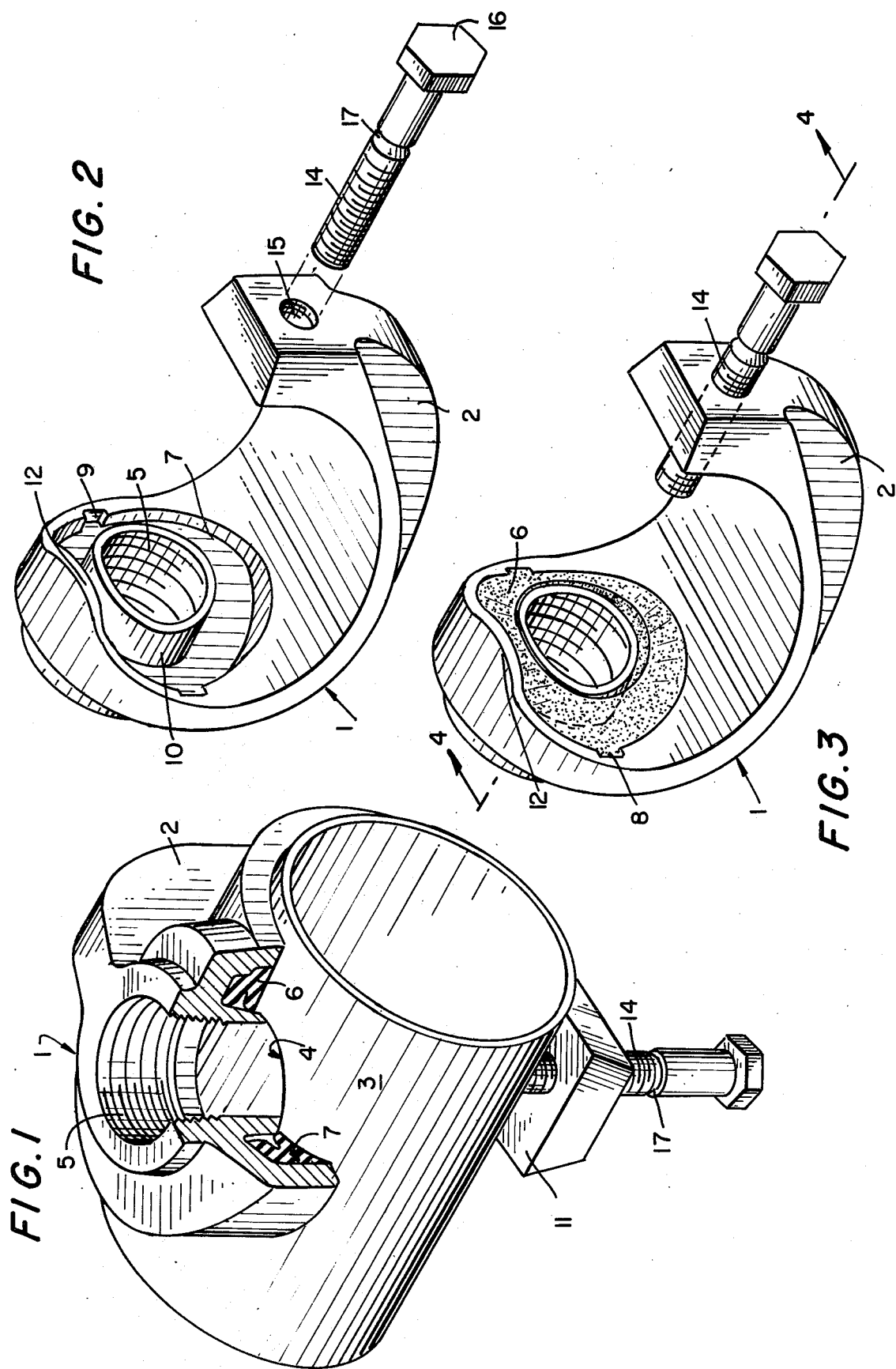

JUNCTION COUPLING FOR PROVIDING A FLUID FLOW BRANCH FROM A MAIN CONDUIT

BACKGROUND OF THE INVENTION

The invention aims at providing a fluid tight junction in a fluid conduit system.

The invention finds particular application in the installation of fire quenching sprinkler systems in commercial and residential buildings.

Traditional and conventional methods of assembling sprinkler heads have necessitated the insertion into a feeder conduit of a tee junction piece. Although such tee junction pieces can be implanted into a main feeder in a number of conventional ways, such as for example screw threading or welding, nevertheless, assembly is inconvenient and expensive and entails removal of a section of the feeder conduit. Moreover, it is comparatively difficult to implant such a tee junction once the main feeder conduit has been installed and, consequently, such branching by means of tee junction pieces can only be effected at predetermined locations.

SUMMARY OF THE INVENTION

The present invention has as a principal object to provide a coupling which can be connected into an already installed feeder conduit without having to disconnect or otherwise interrupt such feeder pipe or conduit.

Moreover, the invention provides a coupling which can be joined to the feeder pipe or conduit at any desired location. The only criterion governing the location of the coupling on the pipe or conduit is the provision of an aperture in the wall thereof.

In its broadest concept, the invention provides a junction coupling for use with a pipe having an aperture in the pipe wall, wherein said junction coupling is a generally C-shaped member dimensioned partly to surround the pipe and having an outlet duct alignable with said aperture in the pipe wall, means for locating said aperture to ensure correct positioning of the C-shaped member on the pipe, and means for securing said member in position on the pipe with said duct and aperture in registering alignment.

The pipe and junction coupling are so dimensioned that the C-shaped member will engage over the pipe only at the location of the aperture therein. This is made possible by the fact that standard diameter pipes are commercially utilized to provide feeder conduit systems. Since the pipe diameters are of standard sizes, it is commercially feasible to manufacture the couplings of such dimensions that they are adapted for use with such standard pipes. Consequently, the C-shaped member can be so dimensioned that the gap between the end extremities defining the opening in the member is insufficient to pass over the standard diameter of the pipe. However, when an aperture is provided in the pipe wall, there is necessarily a local reduction in overall diameter at the location of the aperture. It is at this point only that the coupling C-shaped member may be engaged over the pipe. To this end, the means for locating the aperture to ensure correct positioning of the C-shaped member is the end profile at one extremities of said C-shaped member.

Such profile makes it possible to "hook" the C-shaped member over the pipe by effectively passing the end profile through the saddle provided in the pipe by the aperture.

It is important not to distort the feeder conduit or pipe at the location of a junction and for this reason the means for securing the C-shaped member on the pipe must not be allowed to exert an excessive clamping force. In the preferred embodiment of the invention this goal is achieved by utilizing a shearable bolt as the securing means. Thus, when the junction coupling has been positioned on the pipe at the desired location, the bolt is tightened firmly to secure the coupling in position. Thereafter, application of continued turning torque to the bolt shears the bolt and leaves the coupling firmly secured in position.

The invention further provides a leak proof and fluid tight junction by the provision of a fluid sealing gasket. The gasket extends round the aperture in the pipe wall and is compressed between the pipe and C-shaped member.

With a junction coupling located on the feeder conduit at the location of a sprinkler outlet, it remains only to attach a sprinkler head to the coupling. Such attachment may, of course, be effected either before or after the C-shaped member is emplaced and secured in position. In the preferred embodiment of the invention which will hereinafter be described in detail, the outlet duct extending through the C-shaped member comprises a screw threaded bore dimensioned to receive a threaded inlet spout of a conventional sprinkler head. If desired, a further fluid tight sealing gasket may be interposed between the sprinkler head and the junction coupling.

The invention will be clearly understood from the following description with reference to the accompanying drawings which are non-limitative and show a preferred embodiment of the invention. In the drawings:

BRIEF DESCRIPTION OF THE DRAWINGS

FIG. 1 is a part sectioned perspective view of a junction coupling of the invention seated on a conduit;

FIG. 2 is a perspective view of the coupling shown in FIG. 1 but omitting the sealing gasket;

FIG. 3 is a perspective view similar to FIG. 2 but showing the gasket in position;

DESCRIPTION OF THE PREFERRED EMBODIMENTS

Figure 4:
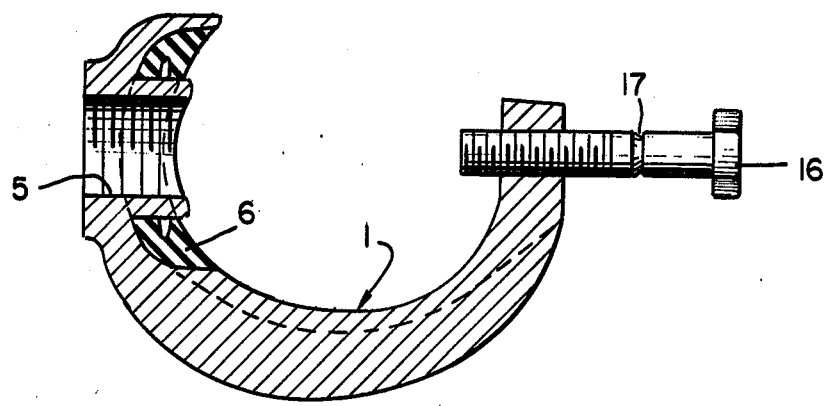
FIG. 4 is a section along the line 4—4 of FIG. 3.

Referring now to the drawings, the junction coupling 1 is shown in its preferred form of a cast metallic member of generally C-shaped configuration. To impart rigidity to the member, the C-shaped casting embodies a rib 2 extending longitudinally along the external surface thereof.

The opening of the C-shaped member is dimensioned to accommodate a pipe 3 or like fluid conduit and the coupling is securable on such pipe in a manner to be described hereinafter.

The coupling 1 seats over the pipe 3 at the location of an aperture 4 in the pipe with an outlet duct 5 in the coupling in registry with said aperture. In this manner, when a fluid tight seal is provided between the coupling and pipe, a junction for the flow of fluid is provided and fluid can exit from the pipe 3 through the duct 5 in the coupling 1.

The fluid tight seal is provided by an annular gasket 6 which seats in a recessed channel 7 provided within the coupling 1 around the duct 5. To this end, the gasket 6, which is preferably formed of resilient elastomeric material, is positively located within the channel 7 on the one hand by ears 8 on the gasket seating in mating recesses 9 in the channel wall and on the other hand by a spigot 10 which confines the duct 5 and stands proud of the bottom of the channel 7. In this manner the inner periphery of the gasket 6 abuts the spigot 10 and the outer periphery of said gasket abuts the wall of the channel 7.

The gasket 6 is preferably internally grooved to facilitate compression and thereby form a reliable seal and is retained within the channel by an appropriate adhesive.

Although the actual dimensions of the C-shaped member constituting the coupling and the outside diameter of the pipe are interdependent, the relative dimensions are crucial to provide an arrangement in which the junction coupling can be assembled on a pipe in situ only at the location of a preformed aperture 4. The commercial importance of such an arrangement is obvious when considering the advantage in being able to form a junction in an already assembled fluid conduit system without having to dismantle and remove lengths of that conduit.

Assembly of the junction coupling on the pipe only at the location of an aperture in said pipe is effected in the following manner. It will be appreciated that when an aperture is provided in the wall of a circular pipe of relatively small diameter, the opening of the aperture necessarily extends part way circumferentially around the pipe wall and hence produces a local reduction in outside diameter of the pipe. It is this local reduction in outside diameter that dictates the location at which the C-shaped coupling may be applied to the pipe. In other words, by making the gap between the end extremities defining the opening of the C-shaped member slightly smaller than the outside diameter of the pipe an interference will occur upon any attempt to position the C-shaped member over the pipe in the radial direction of said pipe. However, by critically governing the dimension between these extremities of the C-shaped member it will be possible to apply the C-shaped member to the pipe at a location where the outside diameter of the pipe is locally reduced by the provision of an aperture.

Figure 5:
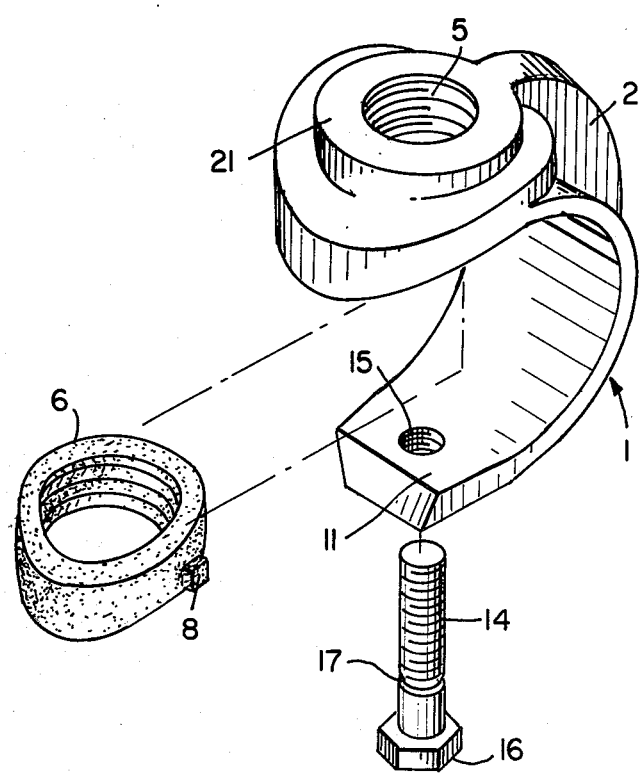
FIG. 5 is an exploded view of the coupling and showing a sprinkler attachment.

To this end, one extremity of the C-shaped member is substantially plane as shown at 11 (FIGS. 1 and 5) while the opposite end is provided with a nose 12 or like projection. In this manner by orientating the C-shaped member to align the nose 12 with the location of the aperture 4, said C-shaped member may be applied to the pipe in the radial direction of the latter and thereafter secured in position.

This mode of assembly has the additional advantage that the coupling 1 may be assembled on the pipe 3 "blind". In other words, even if the aperture 4 is obscured from the view of a person installing the junction, it is possible to orientate the nose 12 in the approximate position of the aperture and then locate the aperture by "feeling" the coupling into position.

Once the coupling is in position seated on the pipe with the duct 5 and aperture 4 in alignment, the coupling is secured in position. Alignment of said duct and aperture may be facilitated by the projecting end of the spigot 10 extending actually into the aperture 4 as shown in FIG. 1. FIG. 4 shows how, for this purpose, the projecting end of the spigot 10 extends through and beyond the depth of the gasket 6.

The manner of securing the coupling in position on the pipe will now be described.

In the embodiment shown in the drawings, the coupling 1 is secured in position on the pipe 3 by means of a screw threaded bolt 14 extending through a cooperating screw threaded bore 15 in that end of the C-shaped member remote from the duct 5. The bolt 14 is shown with a hexagonal head 16 to facilitate rotation thereof to advance the bolt 14 through the bore 15 into abutting contact with the pipe wall 3 at a location diametrically opposite the aperture 4.

In order to avoid the exertion of any undue forces on the wall of the pipe 3, the bolt 14 is designed to shear upon application of a predetermined torque. To this end, the bolt 14 is machined or otherwise provided with a circumferential groove 17 to provide a zone of smaller diameter and consequent lesser strength. Thus, when the bolt is tightened it will advance through the bore 15 to contact the wall of the pipe 3. Thereupon, increased turning by means of the head 16 will tend further to advance the bolt to increase the clamping force. Upon exertion of a predetermined clamping force, further rotation of the head 16 will cause the bolt to shear at the location of the groove 17. In this manner excessive force upon the pipe 3 is avoided.

Although the provision of the groove 17 in the bolt is intended primarily to prevent exertion of excessive forces on the pipe in the manner described above, there is an additional advantage in that when the head portion has shorn from the screw threaded stem portion, further turning of the bolt, in either direction, is made extremely difficult or even impossible. In this manner once the coupling is appropriately assembled on the pipe and secured in position, the assembled junction is essentially tamper proof.

Having assembled and secured the coupling 1 in position on the pipe 3 with the junction duct and pipe aperture in alignment, there remains only the task of attaching to the coupling the desired branch or other outlet. Although the junction coupling obviously lends itself to a large number of applications, a principal use of such coupling is the assembly of sprinkler heads along the length of a fluid conduit at desired locations to provide maximum fire protection. Thus, as shown most clearly in FIG. 5, a conventional sprinkler head 18 is provided with a screw threaded inlet spout 19 for securing to the coupling 1. The duct 5 of the coupling is internally screw threaded to mate with the threads on the spout 19 whereby the sprinkler head 18 may be screwed into position. A gasket or similar seal (not shown) can be interposed between a flange 20 at the terminal end of the screw threaded inlet spout 19 and a flat crown 21 at the outer extremity of the screw threaded duct 5.

It is understood that this invention is not limited in any way by the described and illustrated embodiments, thus different modifications may be encompassed within the scope of the claims.

We claim:

1. A junction coupling for use with a pipe having an aperture in the pipe wall, said coupling comprising a generally C-shaped member having an outlet duct extending through the coupling wall for registering with said pipe aperture and securing means also extending through the coupling wall at a location substantially in diametric alignment with said outlet duct, the distance between the end extremities defining the opening of the C-shaped member being less than the overall diameter of the pipe but of a dimension sufficient to permit the coupling member to be applied radially to said pipe at the location of the aperture and secured by said securing means partly surrounding said pipe with said aperture and outlet duct in registering alignment.

2. A junction coupling as claimed in claim 1, wherein one of said end extremities defining said opening of the C-shaped member is profiled to present a nose-like projection dimensioned to locate the aperture in the pipe.

3. A junction coupling as claimed in claim 2, wherein the outlet duct extends through a flattened crown formed at one end of the C-shaped member outwardly of said nose-like projection.

4. A junction coupling as claimed in claim 3, wherein a fluid sealing gasket extends around said outlet duct.

5. A junction coupling as claimed in claim 4, wherein a recessed channel is located in the underside of said crown and around the outlet duct, and wherein said gasket is a resilient annular seal dimensioned to seat within said recessed channel and yet stand proud of said underside of the crown sealingly to engage a peripheral portion of the pipe around the aperture in the wall thereof.

6. A junction coupling as claimed in claim 1, wherein the securing means comprises a screw threaded aperture extending through said coupling wall and a shearable bolt received in said screw threaded aperture for movement inwardly to exert a predetermined clamping force on the pipe wall at a location diametrically opposite said pipe aperture whereupon the protruding portion of said bolt shears.

7. A junction coupling as claimed in claim 1, wherein the outlet duct is arranged to receive a sprinkler head.

8. In combination a fluid conduit pipe, a junction coupling and a sprinkler head, wherein
   said pipe is provided with an aperture at a location to receive said junction coupling and said junction coupling is dimensioned at least partly to surround said pipe and to cover said aperture, wherein
   said junction coupling is a generally C-shaped member with an outlet duct disposed at one end thereof for alignment with the pipe aperture and with securing means disposed proximate the other end for securing said junction coupling on said pipe with said aperture and duct in registering alignment, wherein
   the end of said C-shaped member embodying the outlet duct is further provided with a nose-like profiled portion for locating the aperture in the pipe, wherein
   the pipe and junction coupling are so dimensioned that the nose-like profiled locating portion of said C-shaped member will permit said member to be applied to the pipe only at the location of the aperture therein, and wherein
   said sprinkler head is received in said outlet duct for fluid tight communication with the interior of said pipe through said junction coupling.

* * * * *